(12) United States Patent
Thomas

(10) Patent No.: US 8,162,348 B2
(45) Date of Patent: Apr. 24, 2012

(54) FOLDING CART

(76) Inventor: Wendell A. Thomas, Evanston, IL (US)

( * ) Notice: Subject to any disclaimer, the term of this patent is extended or adjusted under 35 U.S.C. 154(b) by 699 days.

(21) Appl. No.: 12/123,875

(22) Filed: May 20, 2008

(65) Prior Publication Data
US 2009/0127829 A1      May 21, 2009

(51) Int. Cl.
*B62B 1/00* (2006.01)

(52) U.S. Cl. ............. 280/646; 280/654; 280/47.17; 280/40; 280/63

(58) Field of Classification Search ........... 280/63, 280/42, 652, 654, 659, 47.131, 47.17, 47.2, 280/47.24, 47.27, 40
See application file for complete search history.

(56) References Cited

U.S. PATENT DOCUMENTS

| | | | | |
|---|---|---|---|---|
| 3,861,695 A * | 1/1975 | Shourek et al. | ............. | 280/5.24 |
| 5,294,145 A * | 3/1994 | Cheng | ............. | 280/654 |
| 5,401,043 A * | 3/1995 | Myron | ............. | 280/42 |
| 5,685,552 A * | 11/1997 | Osaki | ............. | 280/47.24 |
| 6,092,817 A * | 7/2000 | Kilmer | ............. | 280/47.26 |
| 6,302,250 B1 * | 10/2001 | Sadow et al. | ............. | 190/18 A |
| 6,443,481 B1 * | 9/2002 | Stravitz et al. | ............. | 280/651 |
| 6,971,654 B2 * | 12/2005 | Amsili | ............. | 280/47.2 |
| 7,407,171 B2 * | 8/2008 | Roberson | ............. | 280/47.18 |

* cited by examiner

*Primary Examiner* — Katy M Ebner

(57) ABSTRACT

A folding cart (20) includes a frame (22) having a first extendable leg and a second extendable leg. A bag support (30) connects the first extendable leg with the second extendable leg and defines a first plate (44) adjacent the first extendable leg. A second plate (46) is defined on the bag support (30) adjacent the second extendable leg. A vertical hinge (48) rotatably connects the first plate (44) with the second plate (46) such that the first plate (44) can rotate relative to the second plate (46) about a bag support (30) axis of rotation such that the cart (20) is can be folded when not in use.

19 Claims, 5 Drawing Sheets

FOLDING CART

TECHNICAL FIELD OF THE INVENTION

The invention pertains generally to carrying devices and more particularly to a system and device for conveniently carrying a backpack or other similar item.

BACKGROUND OF THE INVENTION

Many types of luggage, such as backpacks or suitcases, are difficult to carry around when they carry significant weight. In this context, the term "luggage" includes sacks, bags, and other webbed, knitted, fabric, metal or plastic containers. Many types of folding carts and other devices, many of them built into a bag or suitcase, are available so that a person may tow his or her backpack or other bag on wheels. Most carts' built-in devices add unnecessary weight to the backpack or suitcase, especially when such functionality is not needed, such as when the backpack or suitcase is not full or has a light load. Other carts available for the transportation of luggage are bulky and therefore inconvenient to carry around.

BRIEF SUMMARY OF THE INVENTION

The invention provides a folding cart that includes a frame having a first extendable leg and a second extendable leg. A bag support connects the first extendable leg with the second extendable leg and defines a first plate adjacent the first extendable leg. A second plate is defined on the bag support adjacent the second extendable leg. A vertical hinge rotatably connects the first plate with the second plate such that the first plate can rotate relative to the second plate about a bag support axis of rotation such that the cart can be folded when not in use.

BRIEF DESCRIPTION OF THE SEVERAL VIEWS OF THE DRAWING(S)

DETAILED DESCRIPTION OF THE INVENTION

Figure 1:
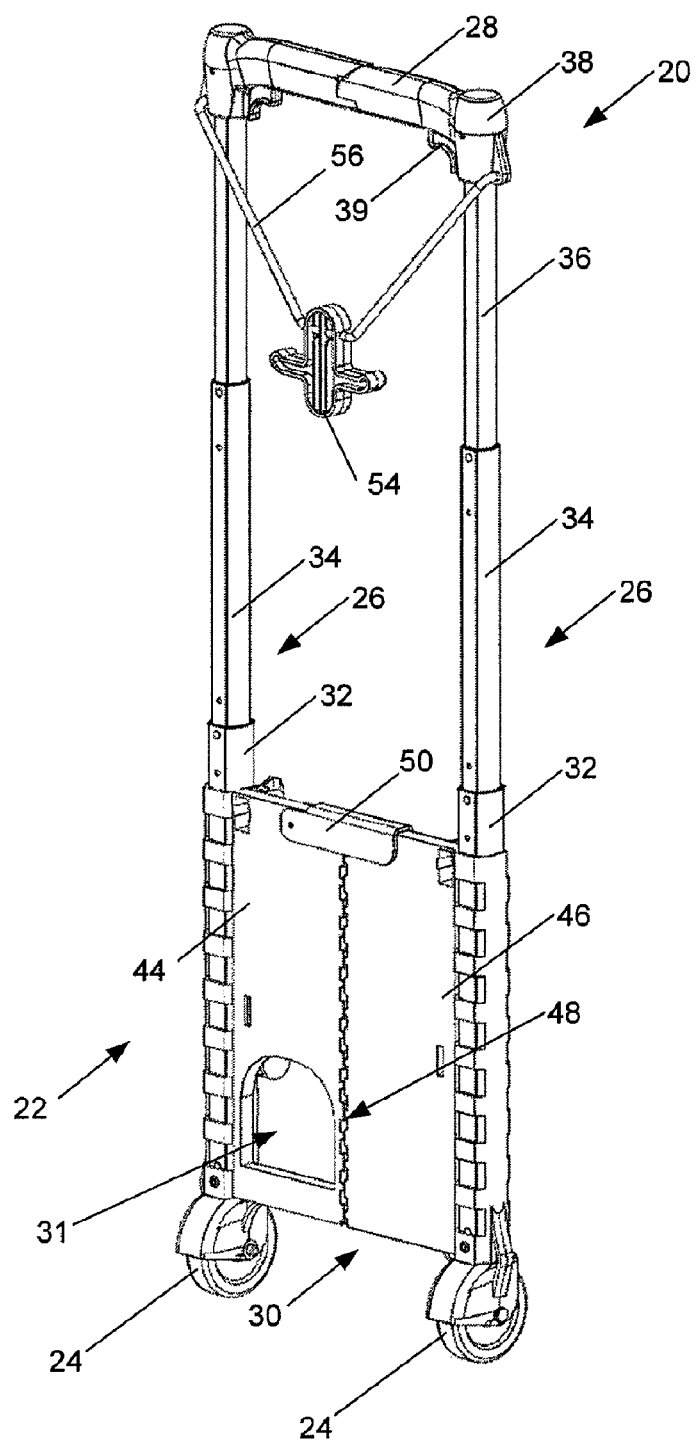
FIG. 1 is a side perspective view of a cart in accordance with an embodiment.
Figure 2:
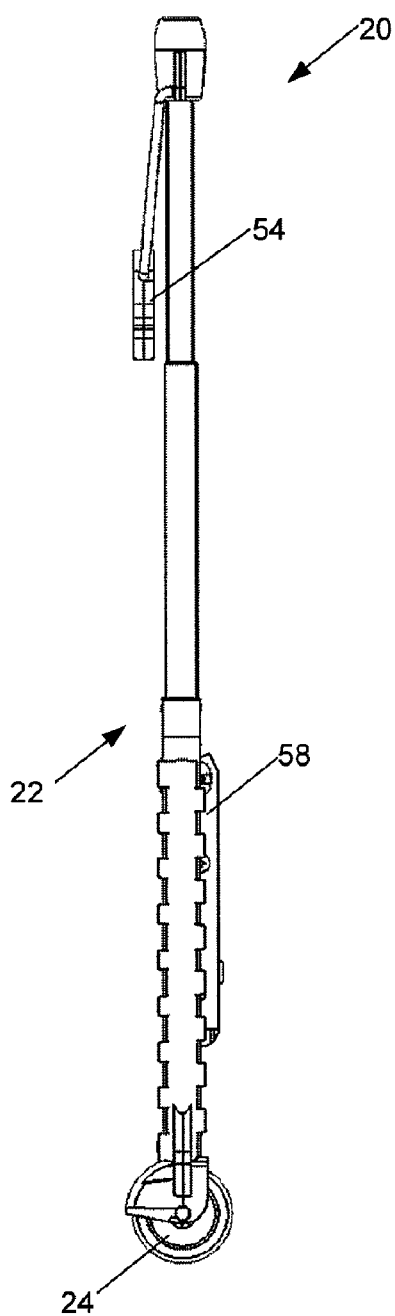
FIG. 2 is a side view of the cart of FIG. 1.
Figure 3:
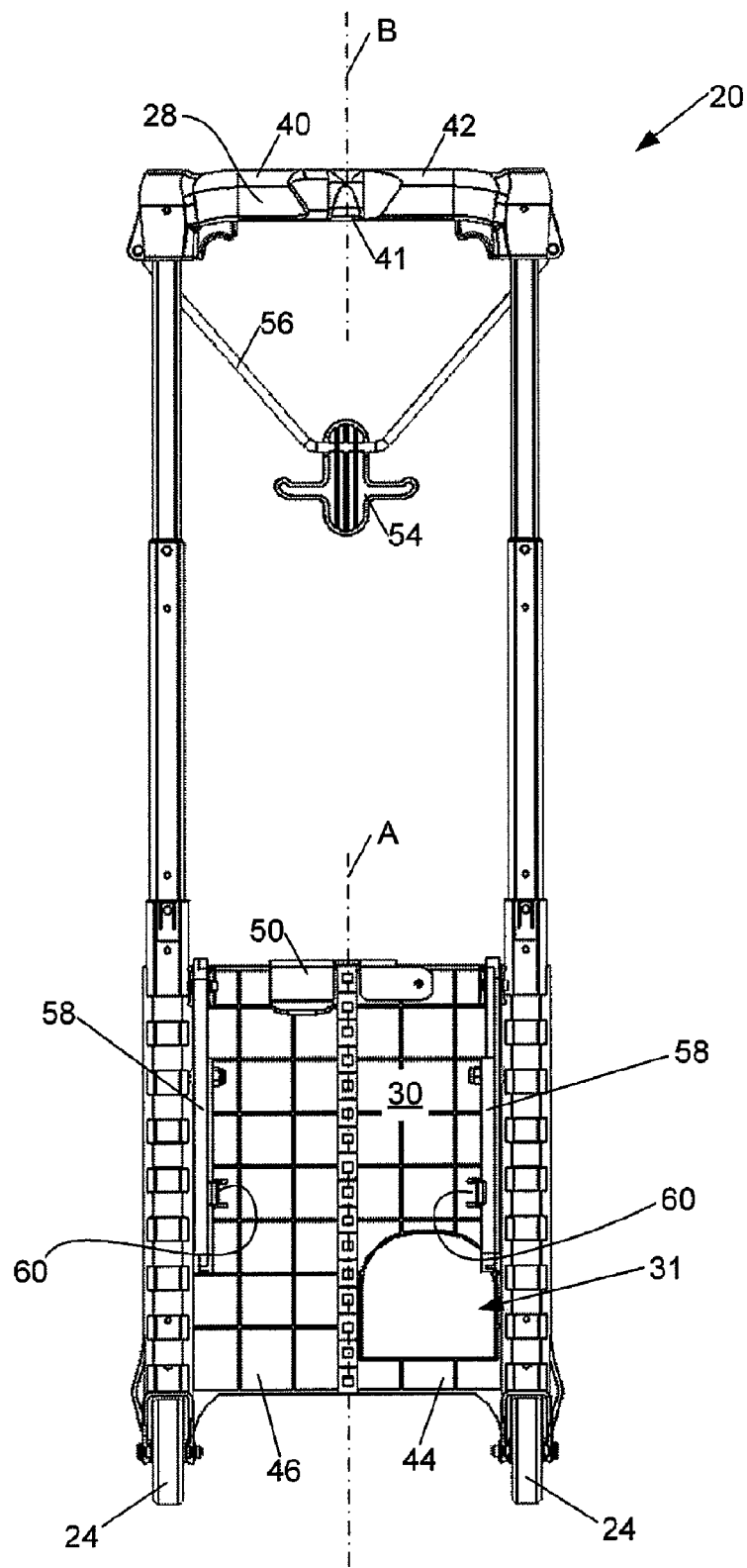
FIG. 3 is a rear view of the cart of FIG. 1.

FIGS. 1 through 3 show a cart 20 for transporting luggage from various perspectives. The cart 20 includes a frame 22 connected to a pair of wheels 24 at a bottom portion thereof. In an embodiment, the frame 22 includes a pair of parallel extendable legs 26 connected together at a top end by a handle 28 and at a bottom end by a bag support 30.

Each extendable leg 26 includes a bottom tube 32, a middle tube 34, a top tube 36 and a locking mechanism 38. The middle tube 34 has outer dimensions approximately equal to inner dimensions of the bottom tube 32 such that the middle tube 34 fits inside the bottom tube 32. Likewise, the top tube 36 has outer dimensions approximately equal to inner dimensions of the middle tube 34 such that the top tube 36 fits inside the middle tube 34. The locking mechanism 38 is a mechanism for preventing motion of the bottom tube 32, middle tube 34, and top tube 36 relative to one another. For instance, the top tube 36 may have a protrusion configured to extend partially or fully through a hole. The top tube 36 may have a protrusion located near a bottom end, the protrusion configured to extend at least partially through a hole located on an upper end of the middle tube 34 to prevent the top tube 36 from moving relative to the middle tube 34. Likewise, a bottom portion of the middle tube 34 may include a protrusion configured to extend through a hole in a top end of the bottom tube 32 to prevent movement of the middle tube 34 relative to bottom tube 32. The locking mechanism 38 is releasable so that the locking mechanism 38 can be disengaged to allow movement of the bottom tube 32, the middle tube 34, and the top tube 36 relative to one another. The handle 28 further includes a trigger 39 that operates to either engage the locking mechanism 38 and prevent relative motion between the bottom tube 32, middle tube 34, and top tube 36, or disengage the locking mechanism 38 and allow movement therebetween. In general, any mechanism capable of allowing movement of the bottom tube 32, middle tube 34, and top tube 36 relative to one another can be used.

The handle 28 includes a first half 40 and a second half 42 hingeably attached to one another at their ends. The first half 40 fits over and is rigidly attached to a top end of the top tube 36. Likewise, an end of the second half 42 opposite the first half 40 fits over and is rigidly attached to a top portion of the corresponding top tube 36. A hinge 41 pivotally connects the first half 40 with the second half 42 of the handle 28 such that the first half 40 can rotate about a handle axis of rotation, B, relative to the second half 42. When the handle 28 is extended, the first half 40 and the second half 41 are advantageously aligned such that the handle 28 is generally straight. In an alternative embodiment, the hinge 41 may include a locking mechanism (not shown) that can selectively constrain rotational motion between the first half 40 and the second half 42 of the handle 28.

The bag support 30 is a flat rectangular structure extending between and connecting the bottom tubes 32 of the extendable legs 26. The bag support 30 includes a first plate 44 attached along a vertical edge to the bottom tube 32 and a second plate 46 attached about a vertical edge to the bottom tube 32 of the other extendable leg 26. A vertical hinge 48 extending between the extendable legs 26 connects the first plate 44 to the second plate 46 and provides for rotation of the first plate 44 relative to the second plate 46 about the vertical hinge 48 or about a bag support axis of rotation, A. A latch 50 for preventing rotation of the first plate 44 relative to the second plate 46 is pivotally attached to a top edge of the first plate 44. The latch 50 is an extended piece of material, such as, metal, having a U-shaped cross-section to extend along an upper edge of the first plate 44, over the vertical hinge 48, and over a top edge of the second plate 46.

A hook 54 for securing the cart 20 to a piece of luggage is connected to upper portions of the extendable legs 26 by a cord 56. The hook 54 may be a T-shaped piece of material, such as, molded plastic, that is capable of extending through and latching onto a structure of a piece of luggage, such as, a handle sewn to the top portion of a backpack or a handle of a suitcase or any of various handles attached to sacks, bags, and other webbed, knitted, fabric, metal or plastic containers. The cord 56 may be elastic and capable of supporting a piece of luggage. The bag support 30 can further include a foothold 31 to aid the user in stabilizing the cart 20 as the bag support is put either in the folded position or the flat position, and as each extendable leg is put in either the extended or collapsed position. The foothold 31 may simply be an opening formed in, for example, the first plate 44, and may even be used as a carrying handle when the cart 20 is folded and not in use, although in an embodiment of the invention a separate carrying bag is provided.

Figure 4:
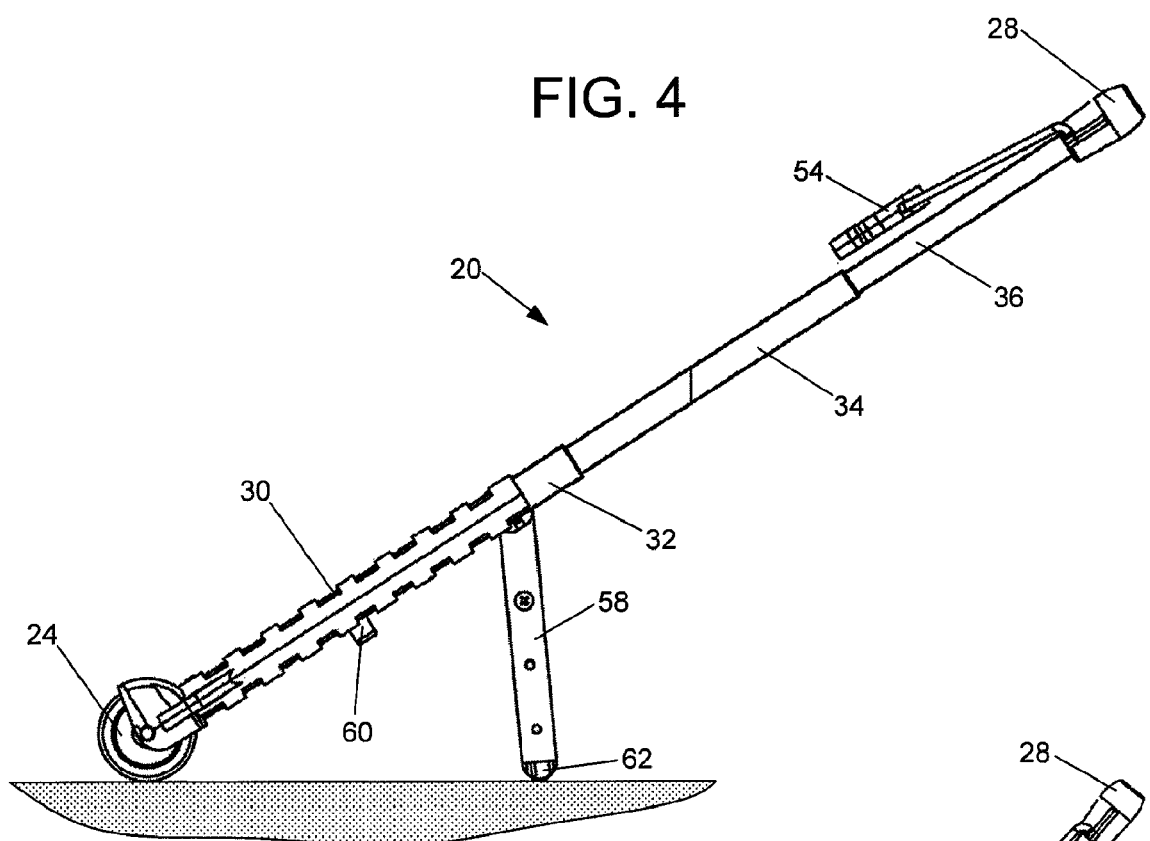
FIG. 4 is a side view of the cart of FIG. 1 with the cart resting on auxiliary legs.
Figure 5:
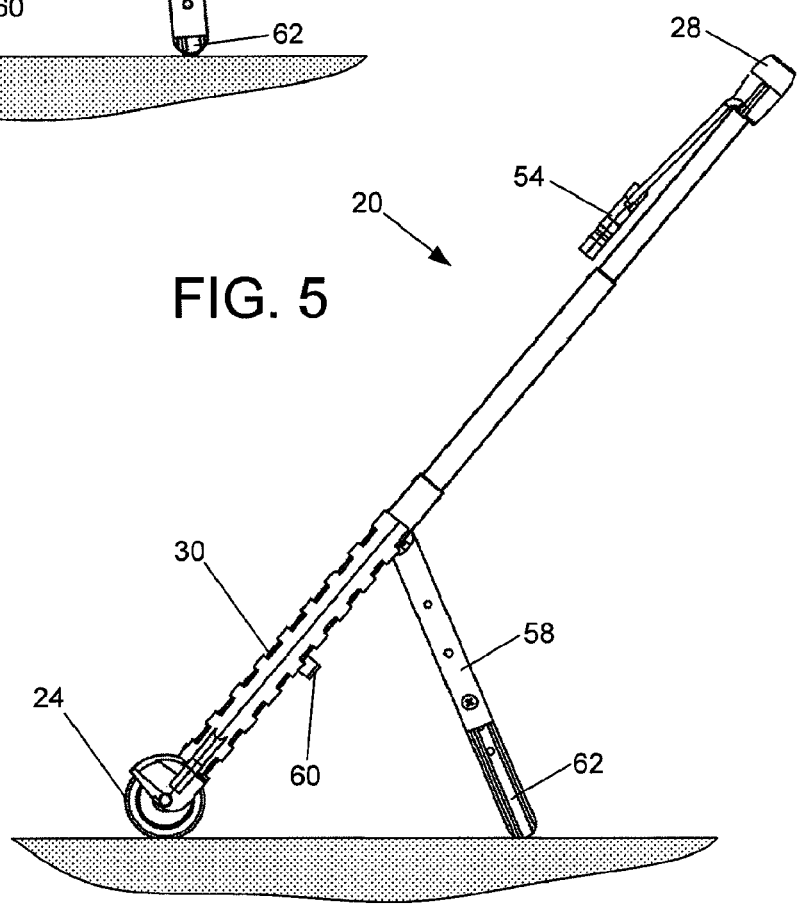
FIG. 5 is a side view of the cart of FIG. 4 with the auxiliary legs in an extended configuration.

FIGS. 4 and 5 show a side view of the cart 20 in accordance with an embodiment. As shown in the drawings, the cart 20 includes an auxiliary leg 58 hingeably attached close to an upper end of the second plate 46. The auxiliary leg 58, which is shown retracted in the side view of FIG. 2, can retract and be latched within channel tabs 60 formed integral to the second plate 46, and be hingeably connected to the second plate 46 such that it can pivot away from the cart 20 as shown in the side views of FIGS. 4 and 5.

Looking to FIG. 3, the additional auxiliary leg 58 is shown hingeably connected to the first plate 44 and retained thereon with an additional channel tab 60. The cart 20 may have one or two auxiliary legs 58 associated therewith. The auxiliary legs 58 may be pivoted from their locked position to allow the cart 20, whether loaded or not, to stand in a relatively upright position without being held by the user in instances when the user requires both hands free, such as, when waiting in line or when waiting to board an airplane. Each auxiliary leg 58 may be made of a hollow tubular member that lockingly accepts a telescoping extension 62. Each telescoping extension 62 may be retained within each auxiliary leg 58 by a locking mechanism, for example, retractable pins that are spring loaded extending through holes formed along the length of each auxiliary leg 58.

Looking now to FIGS. 4 and 5, two possible freestanding positions for the cart 20 are shown. In the position shown in FIG. 4, the auxiliary legs 58 of the cart 20 are extended without further extension of the telescoping extensions 62. In this position, the cart 20 is able to stand alone on a flat surface and at a shallow angle with respect to the floor for use, for example, when the user is seated. In the position shown in FIG. 5, the telescoping extensions 62 have been extended lending a steeper rest angle for the cart 20 with respect to the floor. This position may be used, for example, when the user is standing. In any respect, the ability of the cart 20 to remain self-standing on a flat surface, while loaded or not, presents a practical aspect of use of the cart 20.

Figure 6:
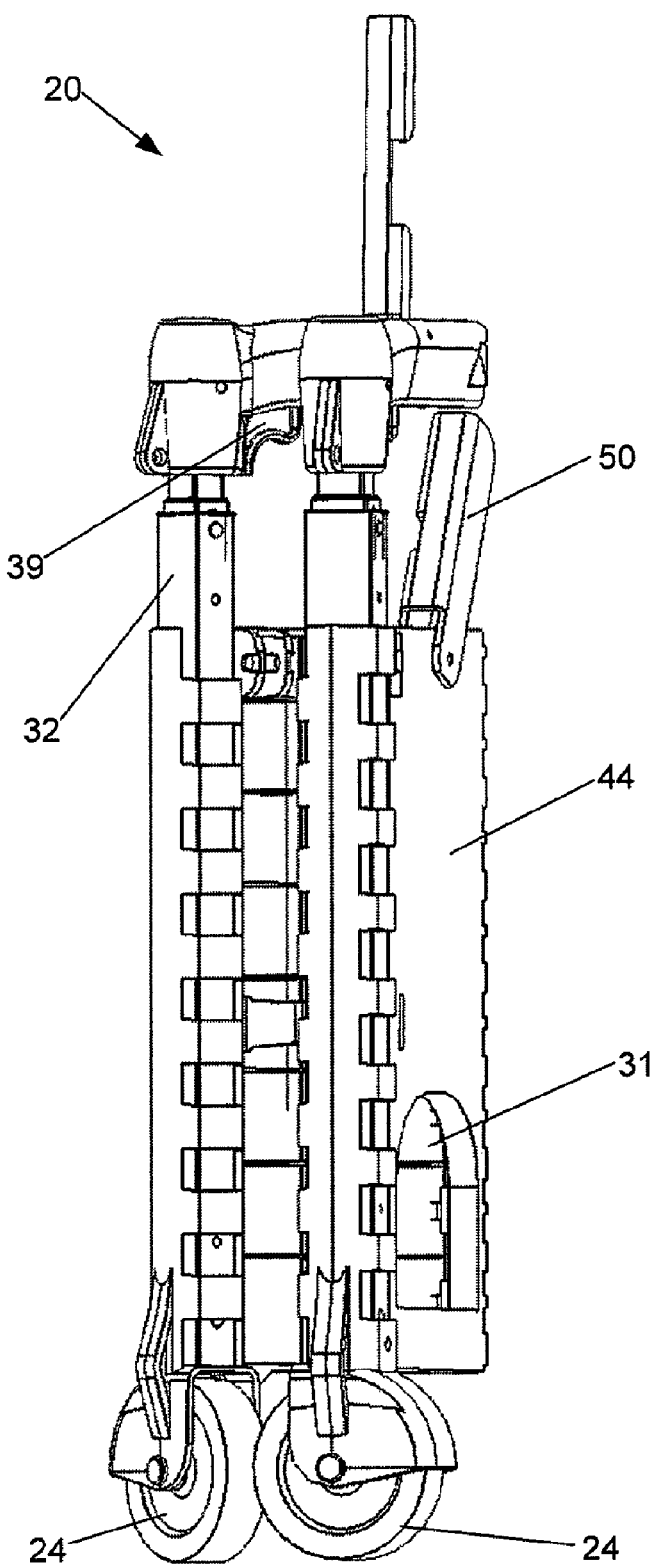
FIG. 6 is a side perspective view of the cart of FIG. 1, the cart in a folded configuration.
Figure 7:
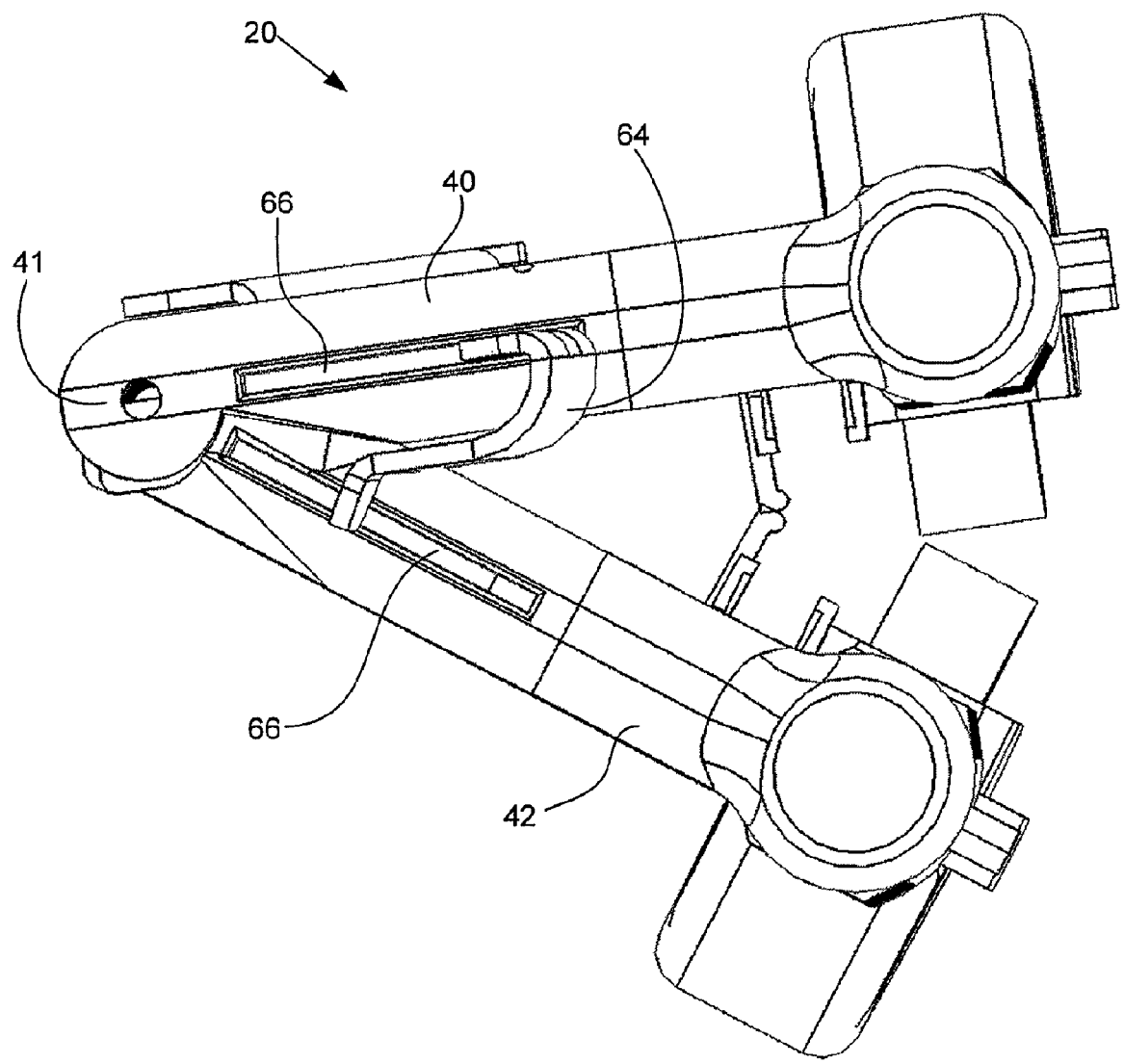
FIG. 7 is a top view of the cart of FIG. 1 in a folded configuration.

As described above, the cart 20 can be folded for ease of transportation when not in use. Two views of the cart 20 in the folded configuration are shown in FIGS. 6 and 7. As described above, the cart 20 may be folded by unlocking or unlatching various portions thereof. A folding operation for the cart 20 may include two main functions by the user. The first function in folding the cart 20, described relative to one embodiment, may include depressing one or both triggers 39 to unlock any retention features existing between the bottom tube 32, the middle tube 34, and the top tube 36. Unlocking these retention features allows the bottom tube 32, the middle tube 34, and the top tube 36 to retract, in a telescoping fashion, into each other and reduce the overall height of the cart 20.

In a second function, the latch 50 may be pivoted away from the second plate 46 allowing the vertical hinge 48 to rotate such that the first plate 44 rotates toward the second plate 46 in one direction, each of the first plate 44 and second plate 46 taking with it its respective bottom tube 32. In the case where an additional locking mechanism is used in the hinge 41 connecting the first half 40 with the second half 42 of the handle 28, the second function may further include a release of that locking mechanism to allow for the entire cart 20 to fold in half at the same time. In this case, the axis of rotation, A, of the bag support 30 around the vertical hinge 48 should coincide with the handle axis of rotation, B, to permit one half of the cart 20 to fold over the other half in unison.

A top view of the cart 20 in the folded configuration is shown in FIG. 7. As can be seen from this figure, a carrying strap 64 extends between the first half 40 and the second half 42 of the handle 28 and, when in the folded configuration, has enough slack to allow for a person's hand to grab onto the carrying strap 64 and carry the folded cart 20. A channel 66 formed partially into each of the first half 40 and the second half 42 of the handle 28 is arranged to house and store the carrying strap 64 when the handle 28 is unfolded such that it does not interfere with the user's grip on the handle 28.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A rolling cart, comprising:
a frame including:
a first extendable leg;
a second extendable leg;
an inverted t-shaped hook suspended from the first and second extendable legs;
a bag support connecting the first extendable leg with the second extendable leg;
a first plate defined on the bag support adjacent the first extendable leg; and a second plate defined on the bag support adjacent the second extendable leg;
a vertical hinge rotatably connecting the first plate with the second plate such that the first plate is arranged to rotate relative to the second plate about a bag support axis of rotation;
wherein the rolling cart is arranged to fold when the first extendable leg and the first plate are rotated about the vertical hinge relative to the second extendable leg and the second plate, and to unfold in like manner, wherein when open, the first and second plates lie in a common plane with one another and with the first and second extendable legs, such that the open cart is flat, and is adapted to carry a backpack in this flat configuration, with the backpack suspended from the inverted t-shaped hook such that the inverted t-shape hook and the flat bag support provide the sole support for the bag.

2. The rolling cart of claim 1, further including:
a handle connected between the first extendable leg and the second extendable leg;
a first half defined on the handle;
a second half defined on the handle; and
an additional hinge rotatably connecting the first half with the second half about a handle axis of rotation;
wherein the handle axis of rotation is arranged to coincide with the bag support axis of rotation.

3. The rolling cart of claim 2, further including:
a carrying strap connecting the first half with the second half; and
a channel formed at least partially in the first half and at least partially in the second half;
wherein the carrying strap is arranged to store within the channel when the handle is in an extended condition.

4. The rolling cart of claim 1, further including an auxiliary leg pivotally connected to the first plate, the auxiliary leg being arranged to pivot away from the hag support such that the rolling cart is capable of standing upright at an angle relative to a flat surface.

5. The rolling cart of claim 4, further including:
a hollow opening formed along a length of the auxiliary leg; and
a telescoping extension lockingly disposed within the hollow opening.

6. The rolling cart of claim 1, further including a pair of wheels disposed, one each, onto an end of each of the first extendable leg and the second extendable leg adjacent to the bag support.

7. The rolling cart of claim 1, further including a latch pivotally connected to the first plate, wherein the latch has a generally U-shaped cross section and is arranged to engage the second plate such that the first plate and the second plate are aligned when the latch is engaged.

8. The rolling cart of claim 1, wherein the first extendable leg includes:
a bottom tube forming a bottom bore extending at least partially therethrough;
a middle tube forming a middle bore extending at least partially therethrough;
a top tube; and
a locking mechanism;
wherein the middle tube is disposed at least partially within the bottom bore, and the top tube is disposed at least partially within the middle bore, such that the top tube and the middle tube extend telescopingly from the bottom tube when the first extendable leg is extended; and
wherein the locking mechanism is arranged to selectively prevent a telescoping motion of the top tube relative to the middle tube and of the middle tube relative to the bottom tube.

9. A folding cart, comprising:
a frame, including:
a first extendable leg;
a second extendable leg;
a bag support connecting the first extendable leg with the second extendable leg;
an inverted t-shaped hook suspended from the first and second extendable legs;
a first plate defined on the bag support adjacent the first extendable leg; and
a second plate defined on the bag support adjacent the second extendable leg;
a vertical hinge rotatably connecting the first plate with the second plate such that the first plate is arranged to rotate relative to the second plate about a bag support axis of rotation;
a handle connected between the first extendable leg and the second extendable leg, the handle including:
a first half defined on the handle;
a second half defined on the handle; and
an additional hinge rotatably connecting the first half with the second half about a handle axis of rotation;
wherein the rolling cart is arranged to fold when the first extendable leg and the first plate are rotated about the vertical hinge relative to the second extendable leg and the second plate, and to unfold in like manner, wherein when open, the first and second plates lie in a common plane with one another and with the first and second extendable legs, such that the open cart is flat, and is adapted to carry a backpack in this flat configuration, with the backpack suspended from the inverted t-shaped hook such that the inverted t-shape hook and the flat bag support provide the sole support for the bag.

10. The folding cart of claim 9, further including at least one auxiliary leg pivotally connected to the first plate, the at least one auxiliary leg being arranged to pivot away from the bag support such that the folding cart is capable of standing upright at an angle relative to a flat surface.

11. The folding cart of claim 10, further including:
a hollow opening formed along a length of the at least one auxiliary leg; and
a telescoping extension lockingly disposed within the hollow opening.

12. The folding cart of claim 9, further including a pair of wheels disposed, one each, onto an end of each of the first extendable leg and the second extendable leg adjacent to the bag support.

13. The folding cart of claim 9, further including a latch pivotally connected to the first plate, wherein the latch has a generally U-shaped cross section and is arranged to engage the second plate such that the first plate and the second plate are aligned when the latch is engaged.

14. The folding cart of claim 9, wherein the first extendable leg includes:
a bottom tube forming a bottom bore extending at least partially therethrough;
a middle tube forming a middle bore extending at least partially therethrough;
a top tube; and
a locking mechanism;
wherein the middle tube is disposed at least partially within the bottom bore, and the top tube is disposed at least partially within the middle bore, such that the top tube and the middle tube extend telescopingly from the bottom tube when the first extendable leg is extended; and
wherein the locking mechanism is arranged to selectively prevent a telescoping motion of the top tube relative to the middle tube and of the middle tube relative to the bottom tube.

15. A baggage cart, comprising:
a frame, including:
a first extendable leg;
a second extendable leg;
an inverted t-shaped hook suspended from the first and second extendable legs;
a bag support connecting the first extendable leg with the second extendable leg;
a first plate defined on the bag support adjacent the first extendable leg; and a second plate defined on the bag support adjacent the second extendable leg;

a vertical hinge rotatably connecting the first plate with the second plate such that the first plate is arranged to rotate relative to the second plate about a bag support axis of rotation;

a handle connected between the first extendable leg and the second extendable leg, the handle including:

a first half defined on the handle;

a second half defined on the handle; and an additional hinge rotatably connecting the first half with the second half about a handle axis of rotation;

at least one auxiliary leg pivotally connected to the first plate and arranged to pivot away from the bag support such that the baggage cart is capable of standing upright at an angle relative to a flat surface;

a hollow opening formed along a length of the at least one auxiliary leg; and a telescoping extension lockingly disposed within the hollow opening;

wherein the baggage cart is arranged to fold when the first extendable leg and the first plate are rotated about the vertical hinge relative to the second extendable leg and the second plate, and to unfold in like manner, wherein when open, the first and second plates lie in a common plane with one another and with the first and second extendable legs, such that the open cart is flat, and is adapted to carry a backpack in this flat configuration, with the backpack suspended from the inverted t-shaped hook such that the inverted t-shape hook and the flat bag support provide the sole support for the bag.

16. The baggage cart of claim 15, further including:
a carrying strap connecting the first half with the second half; and
a channel formed at least partially in the first half and at least partially in the second half;
wherein the carrying strap is arranged to store within the channel when the handle is in an extended condition.

17. The baggage cart of claim 15, further including a pair of wheels disposed, one each, onto an end of each of the first extendable leg and the second extendable leg adjacent to the bag support.

18. The baggage cart of claim 15, further including a latch pivotally connected to the first plate, wherein the latch has a generally U-shaped cross section and is arranged to engage the second plate such that the first plate and the second plate are aligned when the latch is engaged.

19. The baggage cart of claim 15, wherein the first extendable leg includes:
a bottom tube forming a bottom bore extending at least partially therethrough;
a middle tube forming a middle bore extending at least partially therethrough;
a top tube; and
a locking mechanism;
wherein the middle tube is disposed at least partially within the bottom bore, and the top tube is disposed at least partially within the middle bore, such that the top tube and the middle tube extend telescopingly from the bottom tube when the first extendable leg is extended; and
wherein the locking mechanism is arranged to selectively prevent a telescoping motion of the top tube relative to the middle tube and of the middle tube relative to the bottom tube.

* * * * *